UNITED STATES PATENT OFFICE.

DONALD S. KENDALL, OF EAST ORANGE, NEW JERSEY, ASSIGNOR TO CONDENSITE COMPANY OF AMERICA, OF BLOOMFIELD, NEW JERSEY, A CORPORATION OF NEW JERSEY.

PROCESS OF MAKING A PHENOLIC CONDENSATION PRODUCT.

1,418,718.    Specification of Letters Patent.    Patented June 6, 1922.

No Drawing.    Application filed May 10, 1920. Serial No. 380,114.

*To all whom it may concern:*

Be it known that I, DONALD S. KENDALL, a citizen of the United States, residing at East Orange, in the county of Essex and State of New Jersey, have invented certain new and useful Improvements in Processes of Making a Phenolic Condensation Product, of which the following is a specification.

My invention relates to a method of preparing a phenolic condensation product which is formed from phenol or homologues thereof, formaldehyde and hexamethylentetramin. The product formed by the process is a fusible, soluble phenol resin or partial condensation product having a quantity of hexamethylentetramin dissolved therein, this composition being adapted to pass quickly over to the final infusible condition upon further heating.

In the process disclosed in the patent of J. W. Aylsworth, No. 1,020,593, March 19th, 1912, a fusible phenolic resin or condensation product is first prepared, and a quantity of hexamethylentetramin is incorporated therewith, in a suitable quantity such that a further heating of the mass results in a reaction between the hexamethylentetramin and the fusible resin to produce the hard infusible condensation product. I have now found that a product of the general character of that referred to may be made more effectively or desirably in certain respects by introducing or forming the hexamethylentetramin, which is ultimately used to react with the phenol resin to form the final hard product, at the very beginning of the process, that is, before the fusible condensation product or resin has itself been formed. That is to say, phenol may be incorporated with sufficient formaldehyde to form a fusible resin and a quantity of hexamethylentetramin also incorporated in the mass. At the end of the reaction by which the fusible resin is formed a quantity of hexamethylentetramin will remain dissolved in the resin and free to react therewith upon further heating, the hexamethylentetramin being apparently approximately equal in quantity to that which was introduced into or formed in the mass before the reaction by which the resin was formed.

More particularly, I find it advantageous to use as starting ingredients phenol, formaldehyde solution and aqueous ammonia, the phenol and formaldehyde being in substantially the correct proportions to form the final infusible product upon application of heat. The ammonia is used in substantial quantity, sufficient to react with a part of the formaldehyde to form hexamethylentetramin, the result of this reaction, which takes place immediately upon the incorporation of the mass, being to form the amount of hexamethylentetramin which should remain in solution in the resin after the formation of the latter. (Or, an excess of hexamethylentetramin may be formed by the use of a greater amount of ammonia, without ill effect.) An excess of formaldehyde over that required for reaction with the ammonia is provided, this excess of formaldehyde being sufficient for reaction with the phenol to form the fusible resin. After the formation of the resin the water contained within the mass is removed, preferably by vacuum distillation, leaving as the product of the process a solid or semi-solid fusible phenolic condensation product or resin having dissolved therein a quantity of hexamethylentetramin sufficient, upon further heating, to react with the fusible resin to form an infusible condensation product. Various advantages are gained by the process briefly outlined above. Among these may be mentioned a considerable decrease in the cost of manufacturing operations because of the formation of the hexamethylentetramin in the same operation as the fusible resin. A further considerable advantage is that the product formed in the manner described, consisting of a fusible phenolic condensation product with hexamethylentetramin dissolved therein, in alcohol solution, may be kept at room temperatures for a considerable period of time without any part of the same reacting to a perceptible or harmful degree. When the fusible phenolic condensation product described in the Aylsworth Patent No. 1020593, referred to, is dissolved in alcohol with hexamethylentetramin the hardening reaction (which in practice is brought about by the application of heat) slowly proceeds even at ordinary atmospheric temperatures, so that the effective life of such preparations is limited. The life of the composition formed in the manner referred to herein, is considerably longer.

It may also be stated that the present method results in the hexamethylentetramin being very fully dissolved in the fusible resin. Another advantage of the present process is that the product is prepared very quickly and at a comparatively low temperature. I have found that in my preferred process in which 100 parts of phenol, 100 parts of formaldehyde solution and 20 parts of aqueous ammonia, by weight, are incorporated together, it is only necessary to maintain the mass for about one hour and thirty minutes at a temperature of from 160 degrees F. to 170 degrees F.

It may be remarked that Patent No. 942,809 granted to Baekeland December 7, 1909, contains a warning against the use of a large amount of ammonia in the formation of phenolic condensation products because of the formation, in such a case, of hexamethylentetramin. In the present method I have found that the presence of a comparatively large quantity of hexamethylentetramin throughout the process is not harmful but is apparently beneficial.

In accordance with my invention, as stated, the ingredients are incorporated together, whereupon all of the ammonia and a portion of the formaldehyde immediately combine to form hexamethylentetramin. When the proportions which I consider to be the best adapted for the process are used, namely, 100 parts of commercial phenol, 100 parts of commercial 40 per cent formaldehyde solution and 20 parts of commercial aqueous ammonia (26° Bé.), substantially one-third of the formaldehyde will react with the ammonia to form hexamethylentetramin. This reaction is exothermic, and there is no application of heat from an exterior source necessary. As the hexamethylentetramin is formed it is dissolved and remains in solution in the mass which at this stage is made up of liquid phenol plus the unreacted portion of the formaldehyde, plus the water from the reacted formaldehyde and ammonia.

The reaction by which the hexamethylentetramin is formed takes place very rapidly. The ammonia is preferably added slowly to the other ingredients, and when all of the ammonia has been thus added heat is applied, the mass being contained in a suitable closed vessel. As stated, the heat may be applied for approximately one hour and thirty minutes at a temperature from 160° F. to 170° F. The free water formed or contained in the mass is then removed, preferably by distillation under a vacuum. The product formed is a phenolic gum or resin of a clear light yellow color, this product being semi-solid at ordinary room temperatures, and thinly fluid at 200° F. Upon the removal of the water from the product the hexamethylentetramin contained in the mass goes wholly into solution in the phenolic resin. The product may be quickly converted into the final hard infusible condition by application of heat above 200° F.

In the formation of the fusible product described herein, a number of reactions apparently ensue. A reaction takes place immediately upon the introduction of the ammonia into the mass, between a part of the formaldehyde and the ammonia, as stated, all of the ammonia present being converted into hexamethylentetramin which remains in solution in the liquid phenol and the water of the formaldehyde and ammonia. This reaction takes place very rapidly and generates heat. The heat sets up a reaction between the phenol and the balance of the formaldehyde and also a reaction between the phenol and the hexamethylentetramin. As the latter reacts it sets free its ammonia which again combines with the formaldehyde to form hexamethylentetramin. This cycle continuing, at the end of the reaction there is formed a fusible resin, with the required amount of hexamethylentetramin dissolved in it to carry it to the final hardened and infusible state, after the water present has been separated and further heat applied; as the water is separated by distillation, whatever hexamethylentetramin was in solution in it goes into solution in the fusible resin which is still in a molten state. There is apparently no loss of any of the ingredients by this process and the quantity of hexamethylentetramin in solution apparently remains constant throughout. The temperatures encountered in these reactions are or may be high enough to induce the final reaction in which hexamethylentetramin combines with the resin, to form an infusible final product, but the materials are not exposed long enough to this temperature to carry out the reaction to completion.

In this specification and the appended claims, the term phenol should be understood as including oxybenzol and the homologues thereof having an equivalent action such as a mixture of meta and para cresols. It should be understood that my invention is not limited strictly to the exact details particularly set forth but is as broad as is indicated by the accompanying claims.

What I claim is:—

1. The method of forming a phenolic condensation product which comprises forming a liquid mass consisting of phenol, formaldehyde and water with hexamethylentetramin dissolved therein, the formaldehyde being sufficient to react with the phenol to form a fusible resin and the hexamethylentetramin being sufficient to react with such resin to form an infusible product; and causing the mass to be heated to cause reactions between the phenol, formaldehyde and hexamethylentetramin resulting in the production of a fusible resin containing hexamethylentetramin in solution and containing substantially no uncombined formaldehyde.

2. The method of forming a phenolic condensation product which comprises adding together phenol, formaldehyde solution and aqueous ammonia, the latter in proportion to react with part only of the formaldehyde to form hexamethylentetramin, and causing the mass to be heated to produce a fusible, soluble condensation product containing hexamethylentetramin dissolved therein, said fusible product being at least semi-solid at room temperatures, the hexamethylentetramin being sufficient in quantity to cause the conversion of the mass, after the removal of the water and application of further heating, into an infusible product.

3. The method of forming a phenolic condensation product which comprises forming a mass comprising phenol, formaldehyde and hexamethylentetramin and a solvent for hexamethylentetramin, and causing the mass to be heated sufficiently to form a partial phenol-methylene reaction product together with free hexamethylentetramin substantially equal in quantity to the original amount, the formaldehyde being sufficient in quantity to cause the formation of said partial product, and the hexamethylentetramin being sufficient in quantity to cause hardening of said partial product, on further heating, to substantial infusibility, said partial reaction product being at least semi-solid at room temperatures.

4. The method of forming a phenolic condensation product which comprises adding together phenol, formaldehyde solution and aqueous ammonia, the formaldehyde in proportion to react with the phenol, if free to combine therewith, to form an infusible product, and the ammonia in proportion to react with a substantial proportion of the formaldehyde, to form hexamethylentetramin, and to leave unchanged formaldehyde sufficient to react with the phenol to form a fusible resin, and causing the mass to be heated to form a fusible, soluble, condensation product having hexamethylentetramin dissolved therein, the latter being sufficient in quantity to cause hardening of said fusible resin on further heating to substantial infusibility, and said fusible product being at least semi-solid at room temperatures.

5. The method of forming a phenolic condensation product which comprises forming a liquid mass in which phenol, formaldehyde and hexamethylentetramin and a solvent for hexamethylentetramin are contained in solution, the formaldehyde being sufficient to react with the phenol to form a fusible resin and the hexamethylentetramin being sufficient to react with such resin to form an infusible product, causing the mass to be heated to produce a fusible condensation product with hexamethylentetramin in solution, and removing water from the mass, said fusible product being at least semi-solid at room temperatures.

6. The method of forming a phenolic condensation product which comprises adding together substantially 100 parts of phenol, 100 parts of 40 per cent formaldehyde solution and 20 parts of aqueous ammonia 26° Baumé, by weight, heating the mass at a temperature less than 212° F. sufficiently to form a fusible resin, with water and dissolved hexamethylentetramin, and boiling off the water.

This specification signed and witnessed this 4th day of May, 1920.

DONALD S. KENDALL.

Witnesses:
KENNETH W. MACKSEY,
GEORGE F. HOMNAN.